March 2, 1954
C. DIETERICH
2,670,789
ACETYLENE TORCH WITH ANGULARLY ADJUSTABLE TIP
Filed March 2, 1949
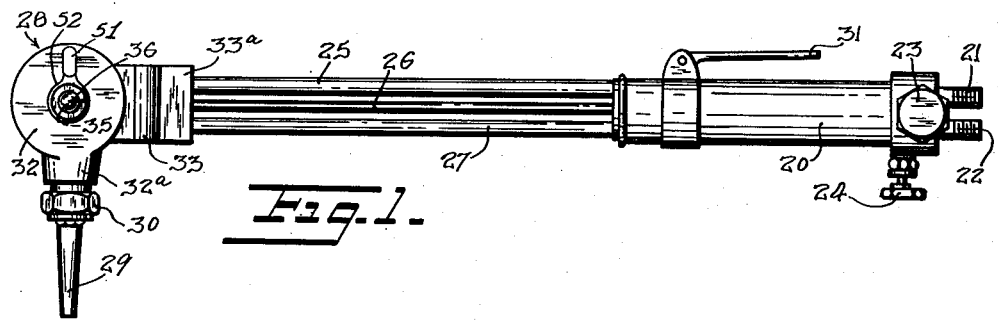
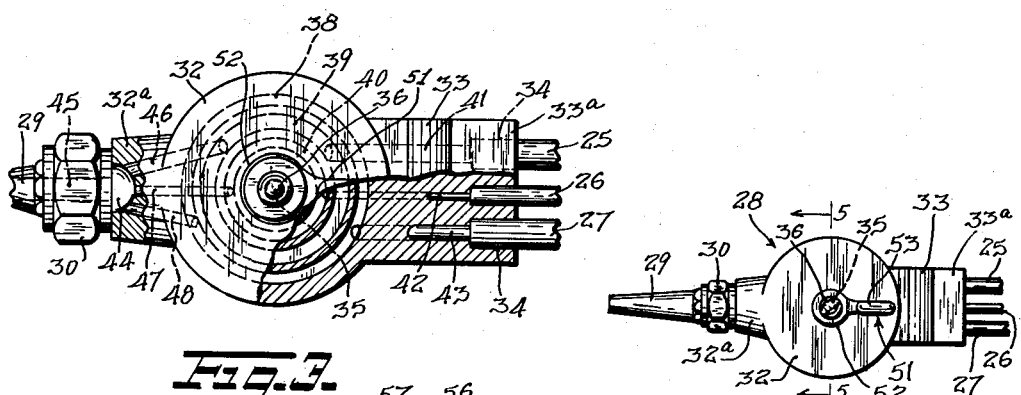
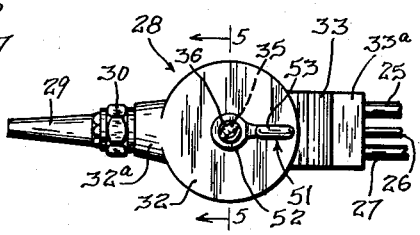
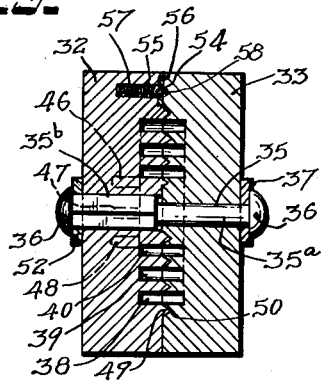
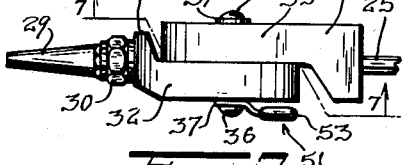
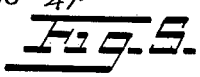
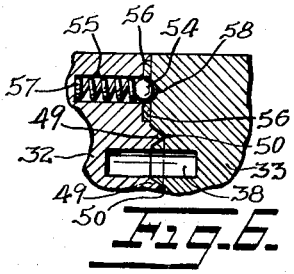
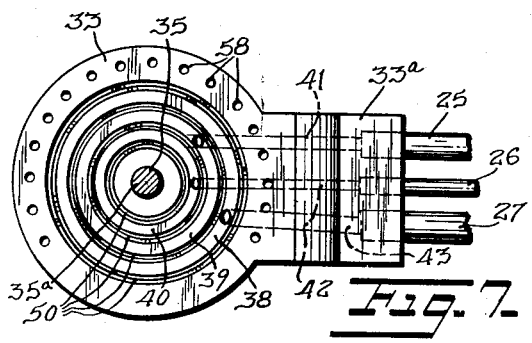
INVENTOR.
CHARLES DIETERICH
BY
Zoltan P. Holachek
ATTORNEY Patented Mar. 2, 1954

2,670,789

UNITED STATES PATENT OFFICE 2,670,789

ACETYLENE TORCH WITH ANGULARLY ADJUSTABLE TIP

Charles Dieterich, Island Park, N. Y.

Application March 2, 1949, Serial No. 79,155

2 Claims. (Cl. 158—27.4)

This invention relates to new and useful improvements in heads for oxyacetylene torches.

More particularly, the present invention proposes the construction of an improved head for a torch adapted to burn a mixture of oxygen and acetylene gas for the purpose of fusing metal for cutting, welding, etc., and more especially, the invention proposes such a head which may be adjusted in a manner to angularly adjust the position of the flame-emitting tip with relation to the longitudinal axis of the torch handle.

Heretofore, it has been common practice to provide oxyacetylene torches with fixedly mounted heads and to provide each torch with several different angularly extended heads to be interchanged with the head being used so as to adapt the torch to the particular needs of a certain job. However, the need to interchange heads is wasteful of time and ofttimes workmen have continued with the head in use regardless of whether the head being used was suited to the job or not with the result that workmen have often suffered serious burns and other mishaps as a result of failing to interchange the heads to adapt the torch to the particular job being done.

The present invention proposes the construction of a head which may be manually adjusted to change the angular disposition of the flame-emitting tip with relation to the handle eliminating the necessity to change heads and the consequent dangers and mishaps resulting from the failure to interchange the head.

Another object of the present invention proposes forming the head of separate sections pivotally connected together, one of which is provided with a tip and the other of which is connected with the tubes which extend longitudinally from the torch handle in a manner so that the simple act of turning the sections relative to each other will adjust the angular position of the tip.

Another object of the present invention proposes forming the tip carrying section with a conveniently located handle in a manner to be manually gripped for adjusting the angular position of the tip when the head is hot as a result of being used.

Still another object of the present invention proposes the provision of novel means for holding the sections of the head in various adjusted positions relative to each other, into which they are manually turned for adjusting the angular position of the tip.

It is a further object of the present invention to provide novel adjustable heads for oxyacetylene torches which are simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of an oxyacetylene torch having an improved head constructed in accordance with the present invention.

Fig. 2 is a plan view of a portion of Fig. 1, but with the tip turned into longitudinal alignment with the handle of the torch.

Fig. 3 is an enlarged side view of Fig. 2 with portions thereof broken away to reveal interior constructions.

Fig. 4 is a side elevational view of the head for an oxyacetylene torch constructed in accordance with the present invention.

Fig. 5 is a transverse enlarged sectional view taken on the line 5—5 of Fig. 4.

Fig. 6 is an enlarged detailed view of a portion of Fig. 5.

Fig. 7 is an enlarged partial longitudinal sectional view taken on the line 7—7 of Fig. 2.

The adjustable head for oxyacetylene torches, according to the form of the invention illustrated in Figs. 1 to 7, is applied to a cutting torch having a handle 20 provided at one end with a pair of threaded nipples 21 and 22. A rubber hose, not shown, from a source of oxygen is to be connected to the nipple 21 and a second rubber hose, not shown, from a source of acetylene is to be connected to the nipple 22. The end of the handle 20, adjacent the nipples 21 and 22 is provided with a valve 23 for controlling the flow of oxygen and a valve 24 for controlling the flow of acetylene through the handle 20. At the other end of the handle 20, there extends the usual high pressure oxygen tube 25, low pressure oxygen tube 26 and acetylene tube 27. The free ends of the tubes 25, 26 and 27 are connected with a head 28 to which the usual flame-emitting tip 29 is connected by the usual tip nut 30. One side of the handle 20 is provided with the usual pivotally mounted high pressure lever 31.

The construction of the handle 20, the tubes 25, 26 and 27, the tip 29 and the tip nut 30 is conventional and forms no part of the present invention. Therefore, further details of those parts will not be given in this specification as such details are generally known to those skilled in the art.

The torch head 28, in accordance with the present invention, is constructed of a separate movable head section 32 and a separate fixed head section 33 having adjacent faces in intimate contact. The movable head section 32 is formed with an offset boss 32ª to which the tip 29 is connected by means of the tip nut 30. Likewise, the fixed head section 33 is formed with an offset boss 33ª to which the ends of the tubes 25, 26 and 27 are connected. As shown in Fig. 3, the boss 33ª is formed with cavities 34 into which the ends of the tubes 25, 26 and 27 are engaged.

The head sections 32 and 33 are pivotally connected together to be turned relative to each other by means of a rivet 35 which passes concentrically through the head sections. The rivet 35 has its ends milled over forming heads 36 which retain the sections 32 and 33 turnably in position on the rivet 35. Interposed between the head 36 of the rivet 35 and the adjacent face of the head section 32 there is washer 37.

The adjacent faces of the head sections 32 and 33 are formed with concentric aligned grooves forming concentric circular chambers 38, 39 and 40. The head section 33 is formed with a passage 41 which connects the end of the high pressure oxygen tube 25 with the circular chamber 39. A second passage 42 is formed in the head section 33 connecting the end of the low pressure oxygen tube 26 with the circular chamber 40. A third passage 43 connects the end of the acetylene tube 27 with the circular chamber 38. The passages 41, 42 and 43 serve to transmit the high pressure oxygen, the low pressure oxygen or the acetylene from the respective tube 25, 26 or 27 to the respective chamber 38, 39 or 40 formed in the adjacent faces of the head sections 32 and 33.

The boss 32ª of the head section 32 is formed at its outer end with a mixing chamber 44 connected by means of a passage 45 with the interior of the tip 29, see Fig. 3. The boss 32ª is formed with a passage 46 extended between the circular chamber 39 and the mixing chamber 44 for conveying the high pressure oxygen to the mixing chamber 44. A second passage 47 is formed in the boss 32ª connecting the circular chamber 40 with the mixing chamber 44 for conveying low pressure oxygen to the mixing chamber 44. A passage 48 is formed in the boss 32ª connecting the circular chamber 38 with the mixing chamber 44 for conveying the acetylene to the mixing chamber.

The gases are conveyed to the mixing chamber 44 from the circular chambers 38, 39 and 40 by the passages 46, 47 and 48 where the turbulent action of the gases entering the mixing chamber 44 causes the gases to be thoroughly intermixed and from there the combustible mixture is conveyed to the flame-emitting tip 29 by the passage 45.

Between the circular chambers 28, 39 and 40, immediately outside the chamber 38 and immediately inside the chamber 40, the inner face of the fixed head section 33 is formed with projections 49 which engage complementary recesses 50 formed in the adjacent face of the movable head section 32 to seal the circular chambers 38, 39 and 40 against possible loss of gas in all rotative positions of the sections 32 and 33. As shown in Fig. 4, the projections 49 and recesses 50 are triangular in cross section.

The rivet 35 connects the sections 32 and 33 together with sufficient frictional contact between their adjacent faces so that the movable head section 32 will retain any pivoted position into which it is turned with relation to the fixed head section 33. As the grooves forming the circular chambers 38, 39 and 40 are in alignment in all rotative positions of the sections 32 and 33 a clear passage is provided for the gases from the tubes 25, 26 and 27 through the passages 41, 42 and 43, the chambers 38, 39 and 40, the passages 46, 47 and 48 to the mixing chamber 44 and through the passage 45 to the tip 29. By turning the movable head section 32 relative to the fixed head section 33, the angular position of the tip 29 is adjusted with relation to the longitudinal axis of the handle 20 and the tubes 25, 26 and 27 adapting the torch to convenient use in out-of-the-way places without the danger of subjecting the user to serious burns.

Also provided are convenient means for permitting the movable head section 32 to be turned relative to the fixed head section 33 notwithstanding that the head 28 may be hot from being used. In addition, this form of the invention also includes a novel means for holding the movable head section 32 in a desired turned position with relation to the fixed head section 33 to in turn retain the tip 29 in a desired angular position with relation to the longitudinal axis of the handle 20 and the tubes 25, 26 and 27.

The means for turning the movable head section 32 relative to the fixed head section 33 is characterized by the fact that the rivet 35 has a rounded portion 35ª which is rotatively extended through the fixed head section 33. The remaining portion 35ᵇ of the rivet 35 is non-circular in cross section and extended through a complementary hole formed in the movable head section 32, so that when the rivet 35' is turned the movable head 32 will be turned in one direction or the other relative to the fixed head section 33 depending upon the direction in which the rivet 35 is turned.

Means is provided to turn the rivet 35 to in turn move the movable head section 32. This means comprises a handle 51 having a shank portion 52 non-turnably mounted on the non-circular portion 35ᵇ of the rivet 35 beneath the head 36 thereof. Radially extended from the shank portion 52, there is a handle portion 53 by which the rivet 35 may be conveniently turned in one direction or the other. The handle portion 53 is preferably formed of a heat resistant material.

The non-circular portion 35ᵇ of the rivet 35 and the complementary hole of the movable section 32 are preferably square in cross section.

The means for holding the movable head section 32 in a desired turned position with relation to the fixed head section 33 is characterized by a spring pressed ball 54 arranged within a cavity 55 extended in from the inner face of the movable section 32. The ball 54 is held in position within the cavity 55 by a plate 56 which is welded in position across the inner face of the movable section 32 over the end of the cavity 55. An expansion spring 57 operates between the base wall of the cavity 55 and the ball 54, urging the ball 54 through a complementary hole formed in the plate 56 and into engagement with one of a plurality of complementary recesses 58 formed in the adjacent face of the fixed head section 33. As shown in Fig. 6, the recesses 58 are arranged in an arcuate line arranged concentric with the rivet 35, and as the movable head section 32 is turned, by means of the handle 51, the ball 54 will snap into and out of the recesses 58 until the desired adjusted position of the tip 29 is reached. When that adjusted position is reached, the ball 54 will be nested in the respective recess 58 holding the tip 29 in the desired adjusted angular position.

The head of the present invention is illustrated applied to an oxyacetylene cutting torch; this is by way of illustration only and it is appreciated that the torch head of the present invention is equally well adapted to use on welding and other similar type torches.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a head of an oxyacetylene torch having a fixed head section connected to a source of oxygen and acetylene and a movable head section positioned adjacent one side of the fixed head section and carrying a flame-emitting tip, said sections having formed in adjacent faces thereof aligned concentric grooves defining separate chambers for said oxygen and acetylene, the grooves in the face of the fixed head being operatively connected to a source of oxygen and acetylene, the grooves in the face of said movable head being operatively connected to said flame-emitting tip, means turnably connecting the head sections so that the position of the tip can be adjusted with relation to the fixed head section, said connecting means comprising a rivet passing through the head sections centrally with respect to said concentric grooves, said rivet having a circular portion rotatively extended through the fixed head section and a non-circular portion extended through a complementary hole formed in the movable head section so that when said rivet is turned in one direction or the other the movable head section will be similarly turned relative to the fixed head section for adjusting the angular position of the tip, a washer non-rotatively mounted on the non-circular portion of said rivet adjacent the outer face of the adjustable head section, and a handle projecting radially from said washer for turning said rivet, and means for releasably holding the movable head section in a desired turned position relative to the fixed head section.

2. In a head of an oxyacetylene torch having a fixed head section connected to a source of oxygen and acetylene and a movable head section positioned adjacent one side of the fixed head section and carrying a flame-emitting tip, said sections having formed in adjacent faces thereof aligned concentric grooves defining separate chambers for said oxygen and acetylene, the grooves in the face of the fixed head being operatively connected to a source of oxygen and acetylene, the grooves in the face of said movable head being operatively connected to said flame-emitting tip, means turnably connecting the head sections so that the position of the tip can be adjusted with relation to the fixed head section, said connecting means comprising a rivet passing through the head sections centrally with respect to said concentric grooves, said rivet having a circular portion rotatively extended through the fixed head section and a non-circular portion extended through a complementary hole formed in the movable head section so that when said rivet is turned in one direction or the other the movable head section will be similarly turned relative to the fixed head section for adjusting the angular position of the tip, a washer non-rotatively mounted on the non-circular portion of said rivet adjacent the outer face of the adjustable head section, and a handle projecting radially from said washer for turning said rivet, the fixed head section having a plurality of recesses formed in its side facing the movable head section, said recesses being arranged in an arcuate line concentric with said rivet, and a spring pressed ball extending from the side of the movable head section on the side facing the fixed head section and selectively engageable with said recesses for holding the movable head section in the desired adjusted position relative to the fixed head section.

CHARLES DIETERICH.

References Cited in the file of this patent

UNITED STATES PATENTS

| Number | Name | Date |
|---|---|---|
| 304,311 | Greene | Sept. 2, 1884 |
| 891,800 | Enrico | June 23, 1908 |
| 1,096,563 | Rosenberg | May 12, 1914 |
| 1,121,457 | Bell | Dec. 15, 1914 |
| 1,232,650 | Briggs | July 10, 1917 |
| 1,255,745 | Henricson | Feb. 5, 1918 |
| 1,495,994 | Farmer | June 3, 1924 |
| 1,498,859 | Wekerle | June 24, 1924 |
| 1,980,636 | Roumillat | Nov. 13, 1934 |
| 2,130,219 | Allison et al. | Sept. 13, 1938 |
| 2,170,305 | Ingwersen | Aug. 22, 1939 |
| 2,188,069 | Walsh | June 23, 1940 |

FOREIGN PATENTS

| Number | Country | Date |
|---|---|---|
| 13,399 | Great Britain | June 3, 1911 |
| 600,349 | France | Nov. 4, 1925 |
| 214,970 | Switzerland | May 31, 1941 |